US012679365B1

(12) United States Patent
Ferguson

(10) Patent No.: US 12,679,365 B1
(45) Date of Patent: Jul. 14, 2026

(54) MODIFYING A VEHICLE STATE BASED ON THE PRESENCE OF A SPECIAL-PURPOSE VEHICLE

(71) Applicant: Waymo LLC, Mountain View, CA (US)

(72) Inventor: David I. Ferguson, San Francisco, CA (US)

(73) Assignee: WAYMO LLC, Mountain View, CA (US)

( * ) Notice: Subject to any disclaimer, the term of this patent is extended or adjusted under 35 U.S.C. 154(b) by 71 days.

(21) Appl. No.: 18/341,379

(22) Filed: Jun. 26, 2023

Related U.S. Application Data

(63) Continuation of application No. 17/232,196, filed on Apr. 16, 2021, now Pat. No. 11,718,297, which is a
(Continued)

(51) Int. Cl.
| | |
|---|---|
| *B60W 30/18* | (2012.01) |
| *B60W 10/04* | (2006.01) |
| *B60W 10/18* | (2012.01) |
| *B60W 10/20* | (2006.01) |
| *G01C 21/34* | (2006.01) |

(Continued)

(52) U.S. Cl.
CPC ...... *B60W 30/18009* (2013.01); *B60W 10/04* (2013.01); *B60W 10/18* (2013.01); *B60W 10/20* (2013.01); *B60W 30/18163* (2013.01); *G01C 21/3415* (2013.01); *G05D 1/0088* (2013.01); *G05D 1/0214* (2013.01); *G05D 1/0289* (2013.01); *B60W 2554/00* (2020.02); *B60W 2710/18* (2013.01); *B60W 2710/20* (2013.01); *B60W 2720/10* (2013.01); *G06F 17/00* (2013.01)

(58) Field of Classification Search
CPC ........... B60W 30/18009; B60W 10/04; B60W 10/18; B60W 10/20; B60W 30/18163; G01C 21/3415; G05D 1/0088; G05D 1/0214; G05D 1/0289; G06F 17/00
See application file for complete search history.

(56) References Cited

U.S. PATENT DOCUMENTS

| | | | |
|---|---|---|---|
| 4,626,850 A | 12/1986 | Chey | |
| 4,747,064 A | 5/1988 | Johnston | |

(Continued)

OTHER PUBLICATIONS

Dave , et al., "A Reasoning Framework for Autonomous Urban Driving", 2008 IEEE Intelligent Vehicles Symposium, 2008.

*Primary Examiner* — Tyler J Lee
(74) *Attorney, Agent, or Firm* — Botos Churchill IP Law LLP

(57) ABSTRACT

A method is provided that includes receiving user input identifying a travel destination for a first vehicle, determining, by a processor, a first route for the first vehicle to follow, and configuring the first vehicle to follow the first route. The method further includes obtaining a model for a second vehicle that shares a road with the first vehicle and comparing model to a pre-determined template for a vehicle that is known to be a special purpose vehicle in order to determine whether the first template and the second template match. The method further includes determining, by the processor, a second route that leads to the travel destination, when a match is found to exist, and switching the first vehicle from following the first route to following the second route.

19 Claims, 10 Drawing Sheets

Related U.S. Application Data continuation of application No. 16/543,901, filed on Aug. 19, 2019, now Pat. No. 11,008,008, which is a continuation of application No. 15/887,329, filed on Feb. 2, 2018, now Pat. No. 10,427,684, which is a continuation of application No. 15/609,725, filed on May 31, 2017, now Pat. No. 9,937,924, which is a continuation of application No. 14/936,918, filed on Nov. 10, 2015, now Pat. No. 9,694,818, which is a continuation of application No. 14/469,290, filed on Aug. 26, 2014, now Pat. No. 9,213,338, which is a continuation of application No. 13/678,027, filed on Nov. 15, 2012, now Pat. No. 8,838,321.

(51) Int. Cl.
  *G05D 1/00* (2024.01)
  *G06F 17/00* (2019.01)

(56) References Cited

U.S. PATENT DOCUMENTS

| | | | |
|---|---|---|---|
| 5,012,221 A | 4/1991 | Neuhaus et al. | |
| 5,036,935 A | 8/1991 | Kohara | |
| 5,495,243 A | 2/1996 | McKenna | |
| 5,610,815 A | 3/1997 | Gudat et al. | |
| 6,055,042 A | 4/2000 | Sarangapani | |
| 6,404,351 B1 | 6/2002 | Beinke | |
| 6,437,690 B1 | 8/2002 | Okezie | |
| 6,700,504 B1 | 3/2004 | Aslandogan et al. | |
| 6,791,471 B2 | 9/2004 | Wehner et al. | |
| 6,822,580 B2 | 11/2004 | Ewing et al. | |
| 6,917,306 B2 | 7/2005 | Lilja | |
| 6,940,422 B1* | 9/2005 | Bachelder | G08G 1/087 |
| | | | 340/916 |
| 7,057,528 B1 | 6/2006 | Ewing et al. | |
| 7,205,888 B2 | 4/2007 | Isaji et al. | |
| 7,295,925 B2 | 11/2007 | Breed et al. | |
| 7,552,004 B2 | 6/2009 | Brikho | |
| 7,979,172 B2 | 7/2011 | Breed | |
| 7,979,173 B2 | 7/2011 | Breed | |
| 8,005,609 B2 | 8/2011 | Uyeki et al. | |
| 8,108,138 B2 | 1/2012 | Bruce et al. | |
| 8,346,480 B2 | 1/2013 | Trepagnier et al. | |
| 8,493,198 B1 | 7/2013 | Vasquez et al. | |
| 8,676,427 B1 | 3/2014 | Ferguson et al. | |
| 8,712,624 B1 | 4/2014 | Ferguson et al. | |
| 8,774,837 B2 | 7/2014 | Wright | |
| 9,599,986 B1 | 3/2017 | Eberbach et al. | |
| 9,694,818 B1 | 7/2017 | Ferguson | |
| 2002/0008635 A1 | 1/2002 | Ewing et al. | |
| 2002/0154217 A1* | 10/2002 | Ikeda | G08G 1/167 |
| | | | 348/148 |
| 2003/0108222 A1 | 6/2003 | Sato et al. | |
| 2003/0201906 A1 | 10/2003 | Buscemi | |
| 2004/0061600 A1* | 4/2004 | Wehner | G08G 1/166 |
| | | | 340/988 |
| 2005/0065711 A1 | 3/2005 | Dahlgren et al. | |
| 2006/0095199 A1 | 5/2006 | Lagassey | |
| 2007/0027583 A1 | 2/2007 | Tamir et al. | |
| 2007/0159354 A1* | 7/2007 | Rosenberg | G08G 1/0965 |
| | | | 340/902 |
| 2008/0079571 A1 | 4/2008 | Samadani | |
| 2008/0161987 A1 | 7/2008 | Breed | |
| 2008/0162027 A1* | 7/2008 | Murphy | G05D 1/0246 |
| | | | 701/1 |
| 2009/0299573 A1 | 12/2009 | Thrun et al. | |
| 2010/0063664 A1 | 3/2010 | Anderson | |
| 2010/0063672 A1 | 3/2010 | Anderson | |
| 2010/0169009 A1 | 7/2010 | Breed et al. | |
| 2010/0228482 A1 | 9/2010 | Yonak | |
| 2010/0256867 A1* | 10/2010 | Breuer | G07C 5/0891 |
| | | | 348/149 |
| 2010/0280751 A1 | 11/2010 | Breed | |
| 2011/0125405 A1 | 5/2011 | Blesener et al. | |
| 2012/0072051 A1 | 3/2012 | Koon | |
| 2012/0078572 A1 | 3/2012 | Bando et al. | |
| 2012/0083960 A1* | 4/2012 | Zhu | G01S 17/931 |
| | | | 701/23 |
| 2012/0083998 A1 | 4/2012 | Kizaki | |
| 2012/0109423 A1 | 5/2012 | Pack et al. | |
| 2012/0173069 A1* | 7/2012 | Tsimhoni | B60W 30/18163 |
| | | | 701/25 |
| 2012/0271542 A1 | 10/2012 | Arcot et al. | |
| 2012/0277932 A1 | 11/2012 | Anderson | |
| 2012/0326889 A1 | 12/2012 | Kabler et al. | |
| 2013/0009760 A1 | 1/2013 | Washlow et al. | |
| 2013/0147638 A1 | 6/2013 | Ricci | |
| 2013/0282271 A1 | 10/2013 | Rubin et al. | |
| 2014/0062724 A1 | 3/2014 | Varoglu et al. | |
| 2014/0081517 A1 | 3/2014 | Barrett et al. | |
| 2016/0071418 A1 | 3/2016 | Oshida et al. | |

* cited by examiner

101

320 — Vehicle Control Unit

410 — Processor

420 — Memory

430 — Data

432 — Special-Purpose Vehicle Template

434 — Map Data Structure

440 — Executable Code

442 — Control Logic

STARTING LOCATION:   Node A
TRAVEL DESTINATION:  Node B

Route #1:  A-B, B-C, C-D, D-E
Route #2:  C-F, F-E

434

| Stretch of Road | Associated Cost |
|:---:|:---:|
| A-B | 5 |
| B-C | 2 |
| C-D | 3 |
| C-F | 25 |
| D-E | 4 |
| E-F | 4 |

Fig. 6

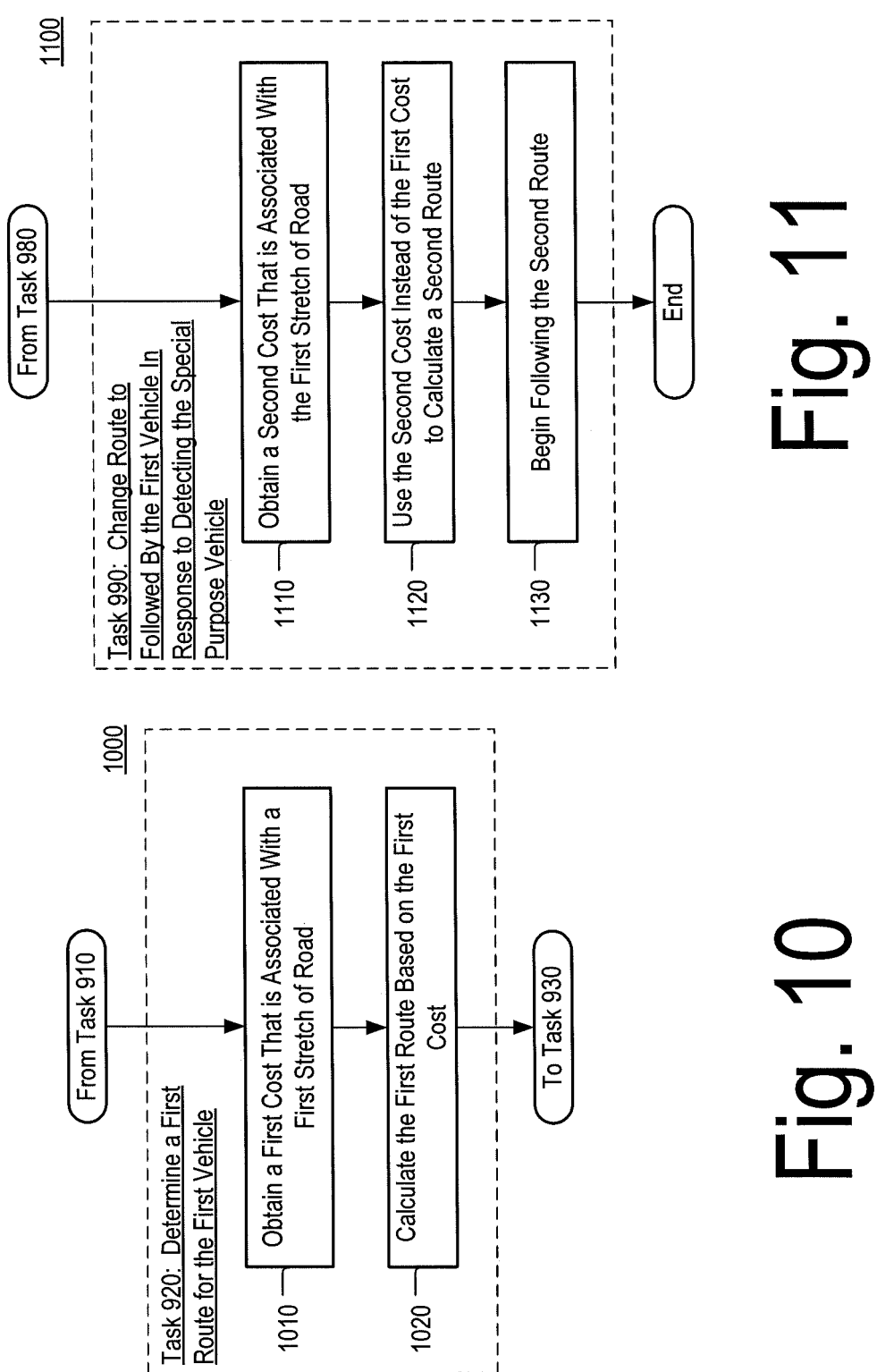

1100

From Task 980

Task 990: Change Route to Followed By the First Vehicle In Response to Detecting the Special Purpose Vehicle 1110 — Obtain a Second Cost That is Associated With the First Stretch of Road 1120 — Use the Second Cost Instead of the First Cost to Calculate a Second Route 1130 — Begin Following the Second Route End

From Task 910

Task 920: Determine a First Route for the First Vehicle

1010 — Obtain a First Cost That is Associated With a First Stretch of Road

1020 — Calculate the First Route Based on the First Cost

To Task 930

Fig. 10

MODIFYING A VEHICLE STATE BASED ON THE PRESENCE OF A SPECIAL-PURPOSE VEHICLE

CROSS-REFERENCE TO RELATED APPLICATIONS

The present application is a continuation of U.S. patent application Ser. No. 17/232,196, filed Apr. 16, 2021, which is a continuation of U.S. patent application Ser. No. 16/543, 901, filed Aug. 19, 2019, now U.S. Pat. No. 11,008,008, which is a continuation of U.S. patent application Ser. No. 15/887,329, filed Feb. 2, 2018, now U.S. Pat. No. 10,427, 684 issued on Oct. 1, 2019, which is a continuation of U.S. patent application Ser. No. 15/609,725, filed May 31, 2017, now U.S. Pat. No. 9,937,924 issued on Apr. 10, 2018, which is a continuation of U.S. patent application Ser. No. 14/936, 918, filed Nov. 10, 2015, now U.S. Pat. No. 9,694,818 issued on Jul. 4, 2017, which is a continuation of U.S. patent application Ser. No. 14/469,290, filed on Aug. 26, 2014, now U.S. Pat. No. 9,213,338 issued on Dec. 15, 2015, which is a continuation of U.S. patent application Ser. No. 13/678, 027, filed Nov. 15, 2012, now U.S. Pat. No. 8,838,321 issued on Sep. 16, 2014, the disclosures of which are incorporated herein by reference.

BACKGROUND

Smart vehicles rely on computing systems to aid in the transport of passengers. The computing systems may control the operation of various vehicle systems, such as braking, steering, and acceleration systems, and they may be used to guide the autonomous vehicles from one location to another. Autonomous vehicles use various computing systems to select the fastest route to their travel destination, avoid obstacles, and otherwise operate in a safe and dependable manner.

SUMMARY

In one aspect of the disclosure, a method is provided that includes determining, by a processor, a first route for the first vehicle to follow; receiving sensor data from a sensor of the first vehicle; generating from the sensor data a model representing a characteristic for a second vehicle that shares a road with the first vehicle; comparing the model to a pre-determined template representing a characteristic for a vehicle that is known to be a special purpose vehicle in order to determine whether the model and the pre-determined template match to a threshold degree; upon the model matching the pre-determined template to the threshold degree, determining, by the processor, a second route that leads to the travel destination; and switching the first vehicle from following the first route to following the second route.

In one example, the first route is determined using a first value for a cost associated with a road section and the second route is determined by using a second value for the cost associated with the road section, the second value being different from the first value. In this example, the second value for the cost is determined based on at least one of a type and a state of the second vehicle. In another example, the special purpose vehicle is one of a police car, ambulance, and a fire truck. In a further example, the method includes, after determining that the second vehicle is a special-purpose vehicle, determining, by the processor, a state of the second vehicle, and the first vehicle is switched from following the first route to following the second route based on the state of the second vehicle. In yet another example, the method also includes detecting a set of special-purpose vehicles, and the first vehicle is switched to following the second route based on a number of special-purpose vehicles in the set. In another example, the characteristic for the vehicle that is known to be a special purpose vehicle includes at least one of a shape, a color, or a sound. In a further example, the method also includes prompting, via a user interface of the processor, a user to approve of the first vehicle following the second route, and the first vehicle is switched to following the second route only when user approval is received.

Another aspect of the disclosure provides a method including receiving sensor data from a sensor of a first vehicle; determining, by a processor, a first operational context for the first vehicle based on environmental information for the first vehicle determined from the sensor data, the first operational context including a first plurality of control rules for governing the operation of the first vehicle in a first environment type; operating the first vehicle within the first operational context; generating from the sensor data a model representing a characteristic for a second vehicle that shares a road with the first vehicle; comparing the model to a pre-determined template representing a characteristic for a vehicle that is known to be a special-purpose vehicle to determine whether the model and the pre-determined template match to a threshold degree; and upon the model matching the pre-determined template to the a threshold degree, switching the first vehicle from operating within the first operational context to operating within a second operational context, the second operational context including a second plurality of control rules for governing the operation of the first vehicle in a second environment type, the second plurality of control rules being different from the first plurality of control rules.

In one example, the special-purpose vehicle is a construction vehicle, and the second plurality of rules govern the operation of the first vehicle safely in construction zones. In another example, determining the first operational context includes estimating a first probability of the first vehicle being present in the first type of environment based on a weighted value for the sensor data, estimating a second probability of the second vehicle being present in a third type of environment, different from the first type of environment, based on a second weighted value for the sensor data, and comparing the first probability to the second probability. In this example, switching the first vehicle to operating within the second operational context includes modifying the a weighted value for the sensor data and re-estimating, based on the modified weighted value, the probability of the first vehicle being present in the second type of environment. In addition, the weighted value for the sensor data is modified based on one of a type and a state of the second vehicle. In a further example, the method also includes determining a state of the second vehicle and determining the second operational context based on the state of the second vehicle. In yet another example, the method also includes detecting a set of special purpose vehicles and determining the second operational context based a number of special-purpose vehicles of the set. In another example, the characteristic for the vehicle that is known to be a special purpose vehicle includes at least one of a shape, a color, or a sound. In a further example, the second plurality of control rules for governing the operation of the first vehicle include a rule for determining a speed of the first vehicle, and operating within the second operational context includes adjusting the speed of the first vehicle. In yet another example, the second plurality of control rules for governing the operation of the first vehicle include a rule for determining a direction of travel of the first vehicle, and operating within the second operational context includes adjusting the direction of travel for the first vehicle.

A further aspect of the disclosure provides a system. The system includes a processor configured to determine a first route for the first vehicle to follow; receive sensor data from a sensor of the first vehicle; generate from the sensor data a model representing a characteristic for a second vehicle that shares a road with the first vehicle; compare the model to a pre-determined template representing a characteristic for a vehicle that is known to be a special purpose vehicle in order to determine whether the model and the pre-determined template match to a threshold degree; upon the model matching the pre-determined template to the threshold degree, determine a second route that leads to the travel destination; and switch the first vehicle from following the first route to following the second route.

Yet another aspect of the disclosure provides a system. The system includes a processor configured to receive sensor data from a sensor of a first vehicle; determine a first operational context for the first vehicle based on environmental information for the first vehicle determined from the sensor data, the first operational context including a first plurality of control rules for governing the operation of the first vehicle in a first environment type; operate the first vehicle within the first operational context; generate from the sensor data a model representing a characteristic for a second vehicle that shares a road with the first vehicle; compare the model to a pre-determined template representing a characteristic for a vehicle that is known to be a special-purpose vehicle to determine whether the model and the pre-determined template match to a threshold degree; and upon the model matching the pre-determined template to the a threshold degree, switch the first vehicle from operating within the first operational context to operating within a second operational context, the second operational context including a second plurality of control rules for governing the operation of the first vehicle in a second environment type, the second plurality of control rules being different from the first plurality of control rules.

BRIEF DESCRIPTION OF THE DRAWINGS

FIG. 6 depicts a tabular representation of the graph of FIG. 5.

FIG. 10 depicts a flowchart of a process associated with FIG. 9.

FIG. 11 depicts a flowchart of a process associated with FIG. 9.

DETAILED DESCRIPTION

In accordance with one aspect of the disclosure, an autonomous vehicle identifies a special-purpose vehicle, identifies a state of the special-purpose vehicle, and determines an action based on the state of the vehicle and executes the action. For example, that action may include changing of lanes, slowing down, or pulling over. The special-purpose vehicle may be an emergency vehicle, a construction vehicle, or any other type of vehicle whose presence requires drivers to exercise extra caution.

The special-purpose vehicle may be identified using an array of sensors, such as cameras, microphones, or laser scanners. For example, image recognition techniques may be employed to distinguish special-purpose vehicles, such as police cars, from other vehicles on the road. Microphones can also be used to detect special-purpose vehicles' sirens. Yet further, a laser scanner may be used to obtain 3D representations of vehicles on the road and those representations may then be compared to representations that are known to be of special-purpose vehicles. Once the special-purpose vehicle is identified, the autonomous vehicle may use further sensory input to identify the state of the special-purpose vehicle. Examples of vehicle states include sounding a siren, pulling the autonomous vehicle over, assisting someone in an emergency, and trying to pass the autonomous vehicle. The state of the special-purpose vehicle may be determined, in one example, by using a rule-based approach. Rules may be devised that relate different values for signals received from the sensor array to corresponding vehicle states.

After the state of the special-purpose vehicle is identified, a response action may be determined. In one aspect, the response may modify the instantaneous behavior of the vehicle. The autonomous vehicle may speed up, slow down, pull over, or change lanes in response to detecting the emergency vehicle. For instance, the autonomous vehicle may move to the left lane when it detects that an emergency vehicle is assisting someone in the road's shoulder.

In another aspect, the response may affect the continued operation of the autonomous vehicle. For example, the autonomous vehicle may switch to following an alternative route when the road is likely congested. Oftentimes, the presence of that vehicle As another example, the autonomous vehicle may change the operational context it currently uses to control its operation. When multiple construction vehicles are detected, for instance, the autonomous vehicle may switch to using an operational context suitable for construction zones, thereby ensuring its safe operation in an environment that may be more dangerous than usual. The selected operational context may specify rules for travelling through construction zones, such as rules governing the maximum speed of the vehicle, minimum separation maintained from other vehicles on the road, or the manner in which intersections are handled.

Figure 1:
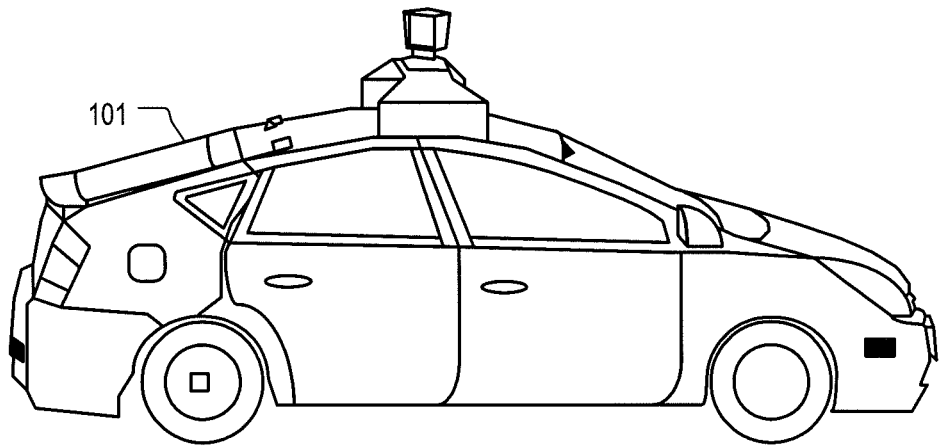
FIG. 1 depicts a side view of a vehicle in accordance with aspects of the disclosure.
Figure 2:
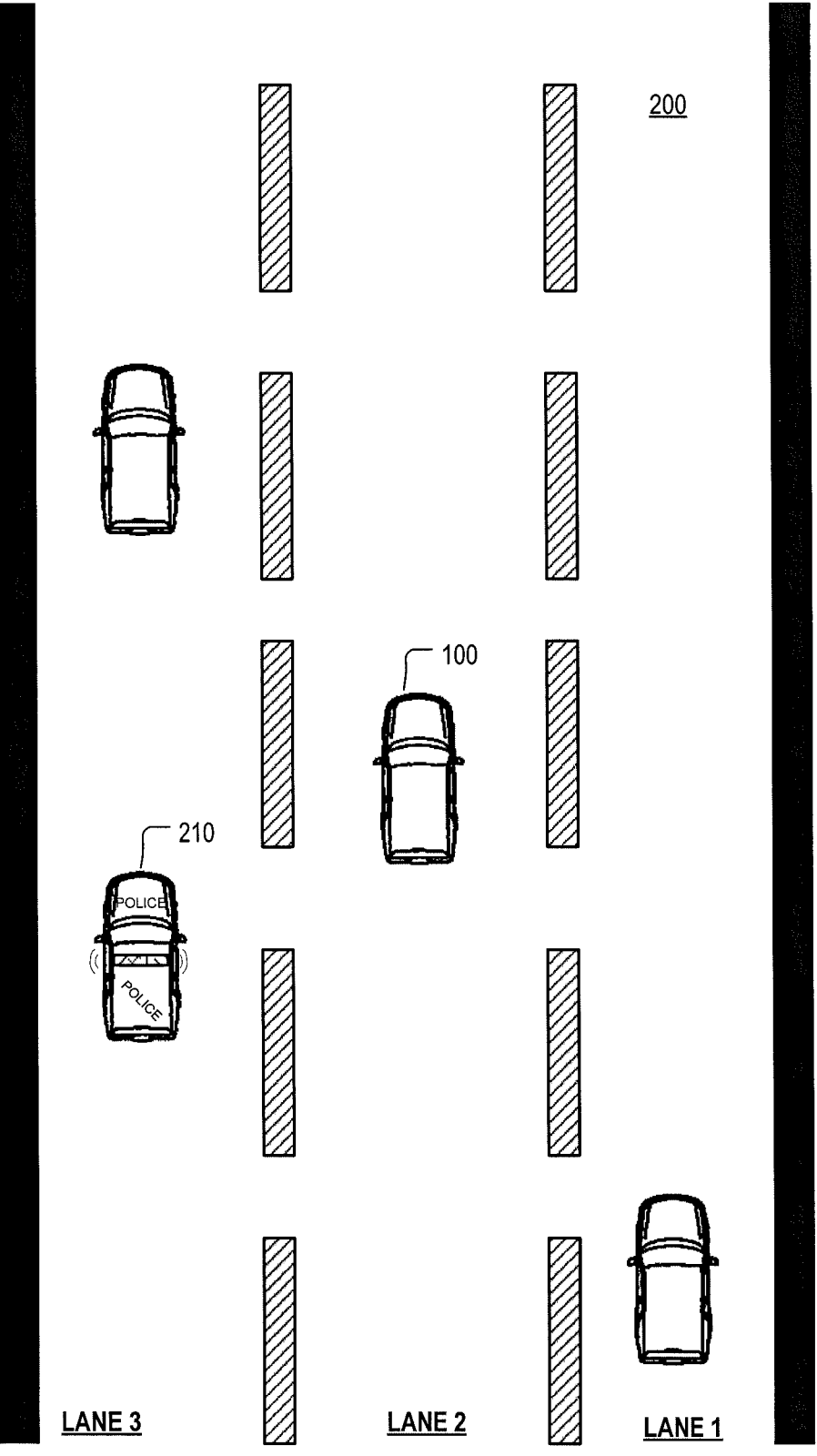
FIG. 2 depicts a diagram of the vehicle of FIG. 1 in operation.

FIG. 1 is a side view of vehicle 101 in accordance with one aspect of the disclosure. Vehicle 101 may be an autonomous or semi-autonomous vehicle capable of driving form one point to another without (or with partial) user input. Although in this example vehicle 101 is an automobile, in various other examples vehicle 101 may be any type of vehicle adapted to carry one or more people, such as a truck, motorcycle, bus, boat, airplane, helicopter, lawnmower, recreational vehicle, amusement park vehicle, farm equipment, construction equipment, tram, golf cart, trains, a trolley, or an unmanned vehicle. In some aspects, the vehicle 101 may detect vehicles that are located within a predetermined distance from the vehicle 101. In one aspect, the predetermined distance may depend on a field of vision (e.g., range) of one or more sensors that are used to detect emergency vehicles. In another aspect, the predetermined distance may be specified by the manufacturer of the vehicle 101 or an operator. Afterwards, the vehicle 101 may process information about detected vehicles (e.g., images or laser scanner readings) and identify one or more of them as special-purpose vehicles. For example, as illustrated in FIG. 2, the vehicle 101 may detect an object such as a special-purpose vehicle 210 that shares the road 200 with the vehicle 110.

When one or more special purpose vehicles are identified, the vehicle 101 may determine the state of any identified special-purpose vehicle and use this information when determining its response to the detection of the special-purpose vehicles. The response may include changing at least one of: speed, direction, travel route, the operational context used to control the vehicle 101.

Figure 3:
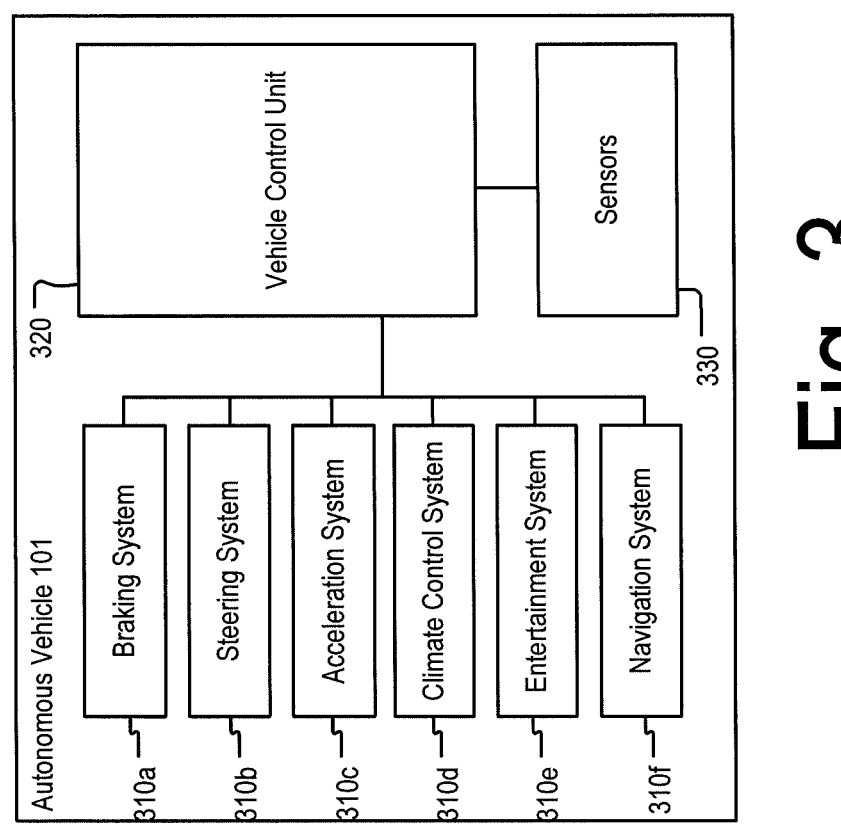
FIG. 3 depicts a schematic diagram of the vehicle of FIG. 1.

FIG. 3 depicts a schematic diagram of the vehicle 101 in accordance with aspects of the disclosure. As illustrated, vehicle 101 includes vehicle systems 310a-f, a vehicle control unit 320, and sensors 330. The vehicle systems 310a-f may include a braking system 310a, a steering system 310b, an acceleration system 310c, a climate control system 310d, an entertainment system 310c, and a navigation system 310f. The above systems are provided only as an example and thus the vehicle systems 310a-f may include any type of system that is capable of performing one or more functions that are normally associated with vehicles, such as braking, steering, playing the radio, rolling down the windows, turning on an air-conditioner, etc. Although the vehicle systems 310a-f are depicted as separate blocks, in some instances they may share components (e.g., computer hardware, mechanical hardware, software, etc.) or they may be fully integrated with one another.

In one example, a vehicle system may include one or more mechanical hardware components that are part of the vehicle (e.g., rack and pinion, engine, brakes, steering motor, suspension, steering pump, etc.) and software that is executed by computer hardware and used to control the operation of the mechanical hardware components. A vehicle system may include, by way of further example, one or more electronic components that are part of the vehicle 101 (e.g., light bulb, music player, radio, air conditioner, windshield wiper motor, steering pump, etc.), and software that is executed by computer hardware and used to control the operation of the electric or electronic components. The vehicle systems may include logic implemented in hardware (e.g. an FPGA or another controller) instead of software for controlling the operation of mechanical or electric vehicle components.

The vehicle control unit 320 may include a computing system for controlling at least some aspects of the operation of the vehicle 101. Vehicle control unit 320 may also be operatively connected to one or more of the vehicle systems 310a-f and it may be operable to change the state of any one of these systems. For example, the vehicle control unit 320 may interact with the braking system, steering system, and acceleration system, to steer, slow down, or accelerate the vehicle. Furthermore, the vehicle control unit 320 may interact with: the climate control system to change the temperature inside the passenger compartment 210, the entertainment system 310e to change the station playing on the radio, or the vehicle navigation system 310f to change a destination the vehicle is travelling to.

Sensors 330 may include one or more sensors, such as a camera, a microphone, a laser scanner, a radar, or another similar sensor. Information provided by the sensors 330 may be processed by the vehicle control unit 320 and used to identify, as special purpose vehicles, one or more vehicles that share the road with the vehicle 101. In some instances, the sensors may be configured to monitor a portion of the road on which the vehicle 101 travelling. For example, they may be configured to monitor only the portion of the road that is behind the vehicle 101 or the portion of the road that is ahead of the vehicle 101.

Figure 4:
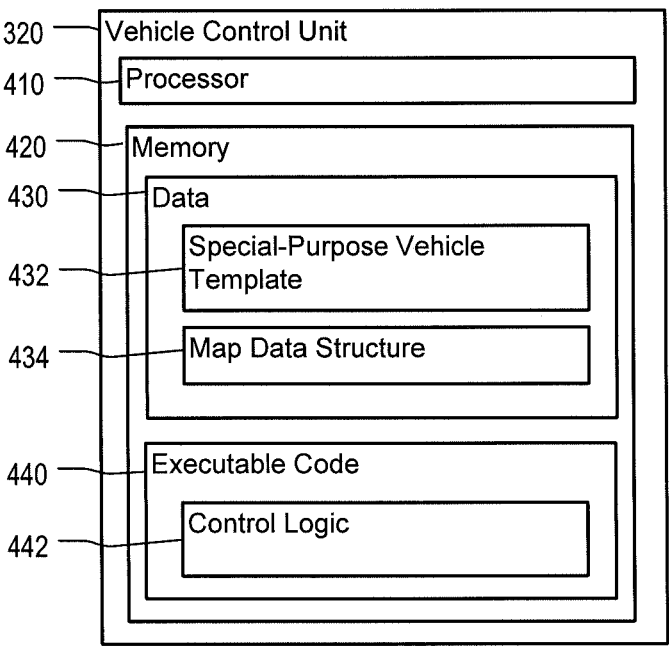
FIG. 4 depicts a schematic diagram of a vehicle control unit of the vehicle of FIG. 1.

FIG. 4 depicts a schematic diagram of the vehicle control unit 320 in accordance with aspects of the disclosure. As illustrated, the vehicle control unit 320 may include a processor 410 and memory 420. Memory 420 of vehicle control unit 320 may store information accessible by processor 410, including executable code 440 that may be executed by the processor 410. The memory also includes data 430 that may be retrieved, manipulated or stored by the processor. The memory may be of any type of tangible media capable of storing information accessible by the processor, such as a hard-drive, memory card, ROM, RAM, DVD, CD-ROM, write-capable, and read-only memories. The processor 410 may be any well-known processor, such as commercially available processors. Alternatively, the processor may be a dedicated controller such as an ASIC.

Data 430 may be retrieved, stored or modified by processor 410 in accordance with the executable code 440. For instance, although the system and method are not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Template 432 may include a model representing a characteristic of a vehicle that is known to be a special purpose vehicle. As shown in FIG. 4, this template may be stored in data 430 of the vehicle control unit 320. For example, a template may include a model representing the shape, appearance, color or sound of the special purpose vehicle. As is further discussed below, the template 432 may be used in classifying vehicles on the road 200 as special purpose vehicles. Specifically, the vehicle control unit 320 may use sensor data to create models for objects such as other vehicles in the surroundings of the vehicle 101.

The template 432 may include a string, number, vector, file, or any other type of data structure. In one example, the template 432 may indicate a characteristic of the appearance of the known special-purpose vehicle. For example, it may be an image of a vehicle known to be a special-purpose vehicle, a histogram of such an image, a set of values that describe a given property of such an image (e.g., eigenvector), a 3D model of the known special-purpose vehicle's shape obtained using a laser scanner, or a set of vertices that describe the shape or part of the shape of the known emergency vehicle. As another example, the template may indicate a color trait or intensity of light produced by the known-emergency vehicle's strobe lights. As yet another example, the template 432 may indicate the sound made by a known-special purpose vehicle, such as the sound of a siren, engine, or another vehicle component.

Returning to FIG. 2, data regarding various aspects of vehicle 210 may be collected by vehicle 101 various sensors. The vehicle control unit 320 may generate a model for vehicle 210 including one or more characteristics of vehicle 210 such as shape, appearance, color or sound. The vehicle control unit 320 may then compare the model for the vehicle 210 to the template 432. If there is a match between the model and the template, for example, the characteristics of both overlap or correspond to a particular degree, this may be an indication that the vehicle 210 possesses a characteristic that is specific to special-purpose vehicles. For example, if the model for the vehicle 210 matches the template 432, because both the model and the template include one or more overlapping characteristics or correspond to at least some minimum percentage or other value, the vehicle 210 may be classified as a special purpose vehicle.

Figure 5:
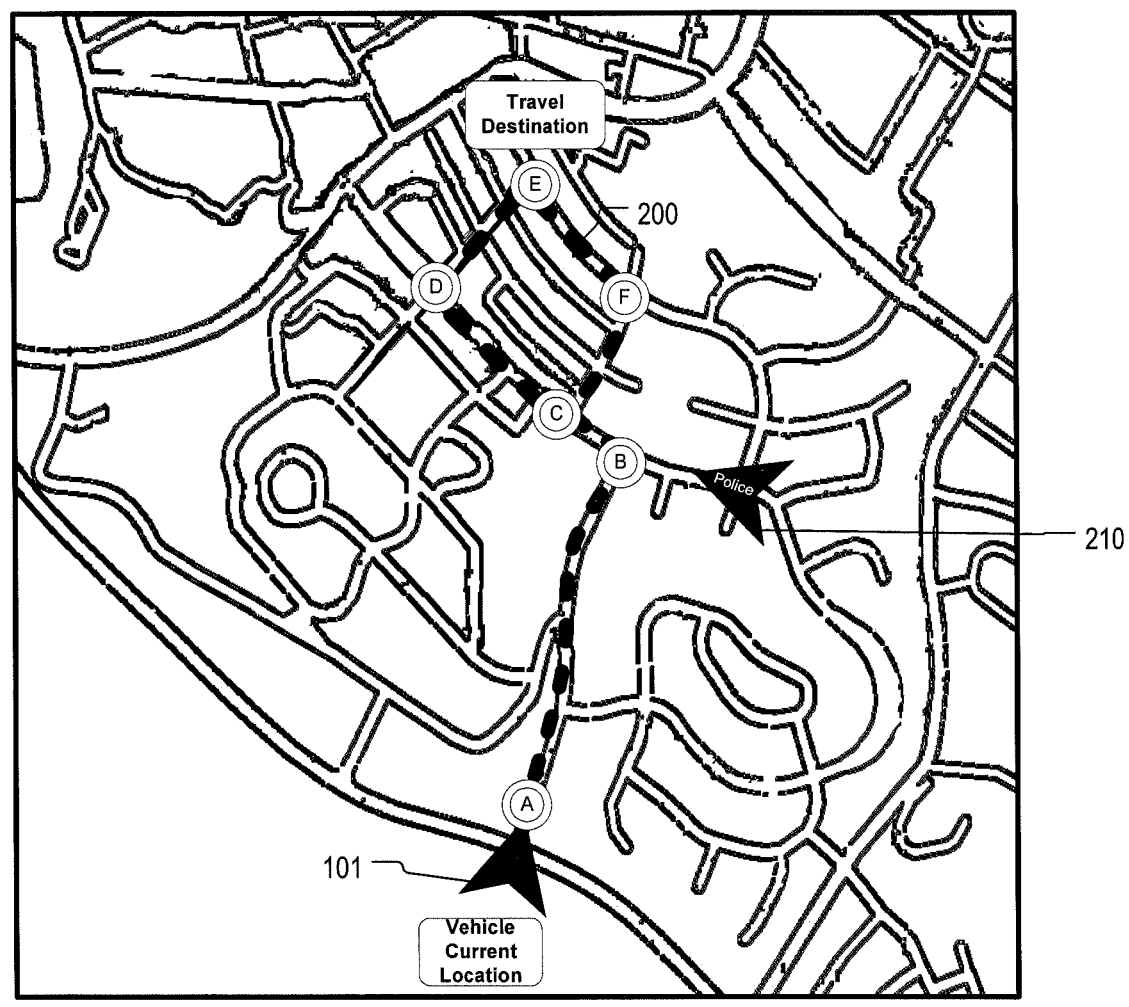
FIG. 5 depicts a graph representing a road map.

Map data structure 434 may be a file or another type of data structure that indicates the connectivity of roads (and/or other drivable surfaces) in the surroundings of the vehicle 101. As shown in the example of FIG. 5, the map data structure 434 may be a graph where each node corresponds to a street intersection and each node represents a road section between two intersections. The tabular representation of the map data structure 434, depicted in FIG. 6, shows that each road section may be associated with a cost value. The cost value may be a number, string, or another object that is usable by a route determination algorithm to determine a preferred route for the vehicle 101 to travel along. As is discussed further below, the cost values may be used by the vehicle control unit 320 to determine a travel route for the vehicle 101.

Figure 7:
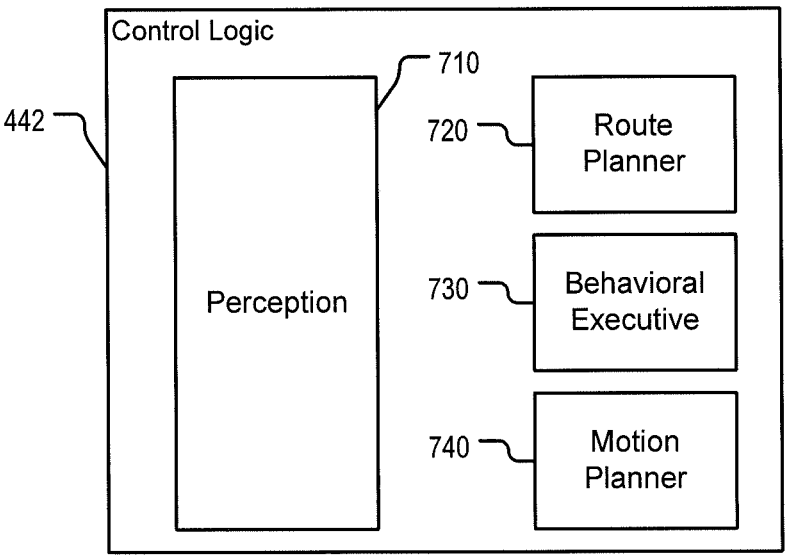
FIG. 7 depicts a schematic diagram of control logic for controlling the operation of the vehicle of FIG. 1.

As illustrated in FIG. 7, the control logic 442 may include a perception module 710, a route planner 720, behavior executive 730, and a motion planner 740. The perception module 710 may process raw data from the sensors 730 to provide the rest of the control logic 442 with a collection of semantically-rich data elements. Such elements may include vehicle state (e.g., position, altitude, and speed of the vehicle 101), road world model (e.g., globally referenced geometry and connectivity of roads, parking zones, and intersections that comprise the road network), moving obstacle set (e.g., identification of other vehicles that share the road with the vehicle 101), and static obstacle set (e.g., identification of non-moving objects that pose a threat to the vehicle 101). Put differently, in the present example, the perception module may be used by the vehicle control unit 320 to identify other vehicles that share the road 200 with the vehicle 101.

The route planner 720 may include logic for calculating a route to a predetermined travel destination. In one aspect, the route planner 720 may calculate the route based, at least in part, on cost values that are associated with different road sections in the map object 432. By way of example, the route planner 720 may use a Djikistra's shortest path algorithm, or some variation thereof, to calculate the route. In that regard, the cost value associated with a particular road section may determine whether that section is included in the vehicle's travel route.

The behavioral executive 730 may include logic for generating different goals for the vehicle 101. Each goal may be generated based on a rule that belongs to one of a plurality of operational contexts. The operational contexts may be implemented by the behavioral executive 730. Each operational context may include a specific set of rules relating to the operation of the vehicle 101. The rules may specify a separation distance from other vehicles on the road, the manner in which lane changes should be performed, the manner in which passing maneuvers should be executed by the vehicle 101, and the manner in which intersections should be handled by the vehicle control unit 320.

The motion planner 740 may include logic configured to receive goals from the behavior executive 730 and generate a trajectory that would guide the vehicle 101 towards the goals. The motion planner 740 may further generate one or more signals, for various vehicle systems (e.g., braking, acceleration, or steering systems), that would cause the vehicle to follow the determined trajectory. For example, the motion planner 740 may receive a goal "maintain a 20-meter separation distance between vehicle 101 and another office. The motion planner may then determine how much to throttle or relax the acceleration system 310*c* in order for the distance to be achieved.

Figure 8:
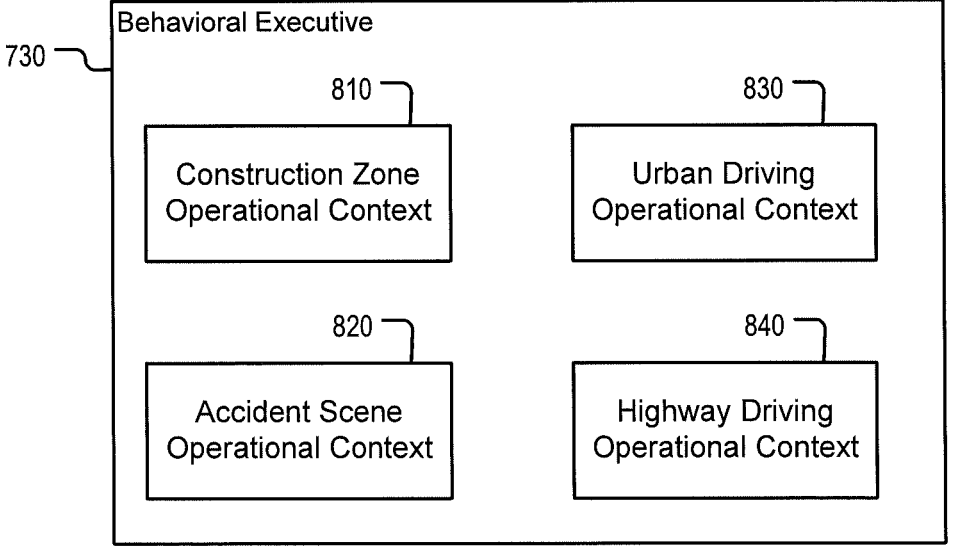
FIG. 8 depicts a schematic diagram of a module of the control logic of FIG. 7.

FIG. 8 depicts a schematic diagram of the behavior executive 730 in accordance with one aspect of the disclosure. As described in more detail below, depending upon the type of environment in which vehicle 101 is currently located, the behavior executive 730 may select and implement a different operational context. Examples of operational contexts may include a construction zone operational context, a scene of accident operational context, urban driving operational context, highway driving operational context, etc. In one example, the construction zone operational context 810 may be designated for use in situations where the vehicle 101 is driving through a construction zone. As such, the construction zone context 810 may include rules requiring the vehicle 101 to drive at a reduced speed, maintain a safe distance from other vehicles, and refrain from changing lanes. The accident scene operation context 820 may be designated for use in situations where the vehicle 101 is driving through a scene of a car crash or another accident. As such, the accident scene operation context may include rules requiring the vehicle 101 to move in the lane that is the furthest from the accident and maintain its current speed in order to prevent a traffic jam. The urban driving operational context 830 may include rules that are specifically designed for a stop-and-go traffic and frequent crossing of intersections. Such rules, for example, may require the maintenance of a shorter separation distance and lower speed by the vehicle 101. The highway driving operational context 840 may include rules that are specifically designed for highway driving.

In some aspects, each one of the operational contexts of behavioral executive 730 may rely on input from a different set of sensors, so that the set of rules that are part of one operational context may be predicated on a different set of sensor data than the sensor data used for the rules in another operational context. Put differently, one operational context may include a rule that is predicated on information obtained from a given sensor (e.g. a radar) while none of the rules in the operational context are predicated on information from the given sensor (e.g., radar information).

For example, when operating in the construction zone operational context 810, such as when vehicle 101 is in construction zones, when the presence of debris and other road obstacles is more likely, the vehicle control unit 320 may need to use a greater number sensors in order to ensure the vehicle's 101 safe operation. In contrast, when operating under the highway driving operational context 840 in a highway driving setting, the presence of road obstacles may be more likely, and thus, a relatively smaller number of sensors may be used.

Figure 9:
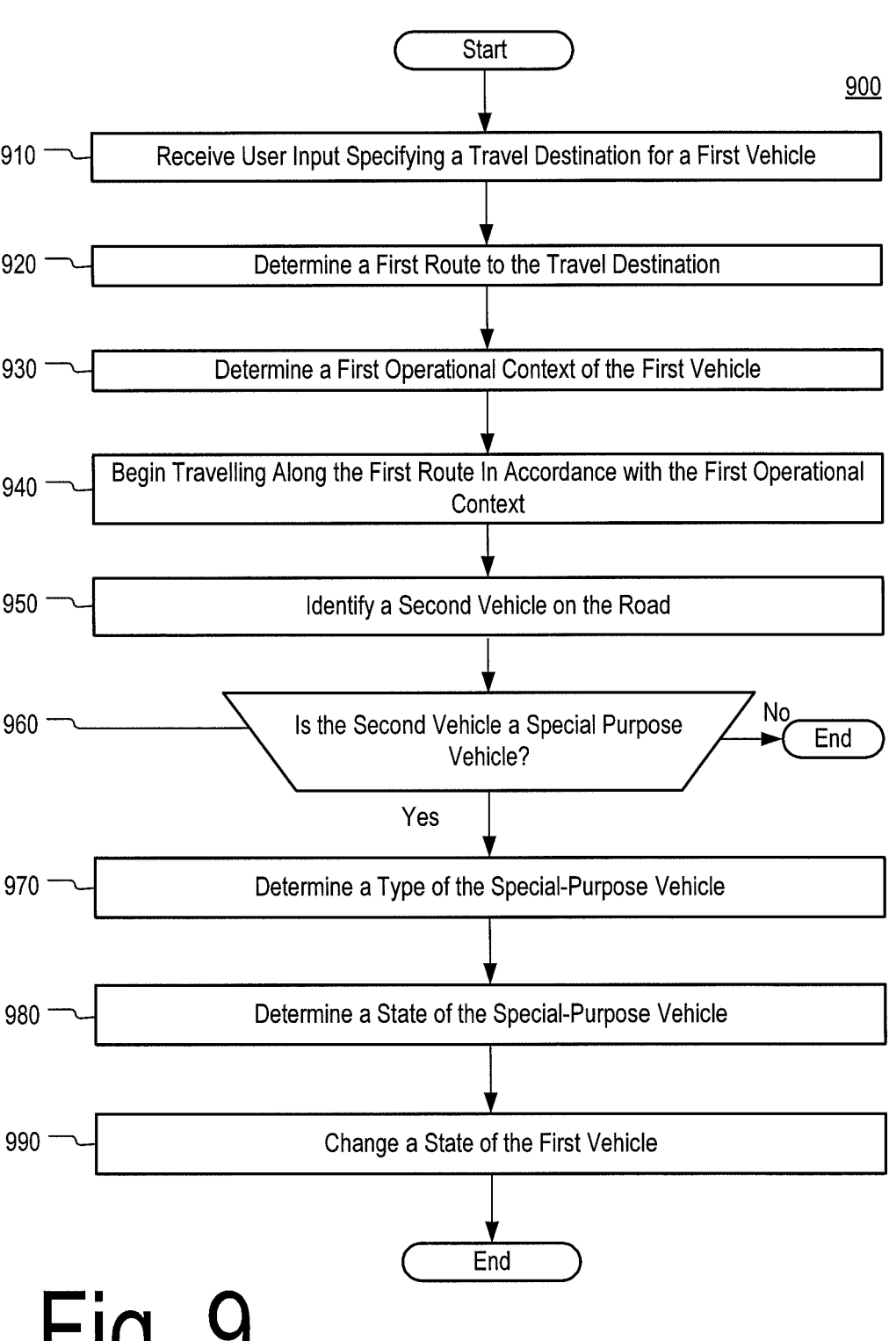
FIG. 9 depicts a flowchart of a process associated with the operation of the vehicle of FIG. 1.

FIG. 9 depicts a flowchart of an example process 900 associated with the operation of the vehicle 101. At task 910, the vehicle control unit 320 receives user input specifying a travel destination for the vehicle. In this example, it will be assumed that the user specified the intersection denoted as node "E" in FIG. 5 as the travel destination.

At task 920, the vehicle control unit 320, using route planner 720, determines a first route for the vehicle 101 to follow. In this example, the first route is route 510, depicted in FIG. 5. The route includes road sections A-B, B-C, C-D, and D-E, also depicted in FIG. 5. At task 930, the vehicle control unit 320 determines a first operational context for the vehicle 101. In this example, the first operational context is the urban driving context 830. At task 940, the vehicle 101 begins traveling along the route 510 in accordance with the first operational context.

At task 950, the vehicle control unit 320 detects an object on the road 200 and identifies it as the vehicle 210. The vehicle 210 may be detected using a laser scanner, radar, camera, or any other sensor typically used by autonomous (or non-autonomous or semi-autonomous vehicles) to detect other vehicles in their surroundings.

At task 960, a determination is made whether the vehicle 210 is a special purpose vehicle. Upon a determination that the vehicle 210 is indeed a special-purpose vehicle, task 860 is executed. Otherwise, the execution of the process 600 is aborted.

Whether the vehicle 210 is a special-purpose vehicle may be determined by receiving input from one or more of the sensors 330 and using the input to generate a model representing a characteristic of the vehicle 210 (e.g., shape, appearance, color, or sound). The generated model for the vehicle 210 may be of the same type as the template 434. Once the model for the vehicle 210 is generated, it may be compared, using standard pattern recognition techniques, to one or more templates for special-purpose vehicles, such as the template 432. If the model of the vehicle 210 matches one or more templates for special purpose vehicles, the vehicle 210 may be classified as a special purpose vehicle.

At task 970, the type of the vehicle 210 is determined. Determining the type of the vehicle 210 may include identifying a genus or sub-genus to which the vehicle 210 belongs. In one example, a determination may be made whether the vehicle 210 is an emergency vehicle, a construction vehicle, or a wide load vehicle. In another example, however, a determination may be made whether the vehicle is a police car, a fire truck, or an ambulance.

At task 980, the state of the vehicle 210 is determined. The state of the vehicle may be determined based on feedback from the sensors 330 and in accordance with one or more rules. The sensor feedback may include speed of the vehicle 210, whether the vehicle 210 is stationary, whether the vehicle's 210 strobe lights are flashing, whether a siren (or another audible alarm) is on, whether the vehicle is making a noise associated with its operation (e.g., excavation noise, jackhammer noise). A non-exhaustive list of example rules for determining the state of the vehicle may include:

R1: If the special-purpose vehicle is flashing its lights and driving in a different lane from the autonomous vehicle, conclude that the special-purpose vehicle is trying to pass the autonomous vehicle.

R2: If the special-purpose vehicle is driving in the same lane as the autonomous vehicle, at a distance of less than (5-30 m), and starts flashing its lights, conclude that the special-purpose vehicle is trying to pull over the autonomous vehicle.

R3: If the special-purpose vehicle is pulled over on the side of the road, conclude that the vehicle is assisting someone.

At task 990, a state of the vehicle 101 is changed in response to determining that the vehicle 210 is a special-purpose vehicle. Changing the state of the vehicle 101 may include changing the state of one of the vehicle systems 310a-f. For example, it may involve turning down the stereo, turning on headlights, turning on emergency lights, or another similar action. Furthermore, changing the state of the vehicle may include selecting a new route for the vehicle to follow (See FIG. 11) or selecting a new operational context for the vehicle 101 to operate under (See FIG. 13). Furthermore, in yet another alternative, changing the state of the vehicle may include changing at least one of the speed and direction of the vehicle 101. For example, upon the detection of the special purpose vehicle, the vehicle control unit 320 may cause the vehicle 101 to pull over to the side of the road or slow down. As another example, upon detection of the special purpose vehicle, the vehicle control unit 320 may cause the vehicle 101 to change lanes by moving the vehicle 101 to the lane on the road that is the furthest away from the vehicle 210, the left lane, the right lane, or any other lane on the road.

In instances where changing the state of the vehicle 101 includes selecting a new route for the vehicle to follow, the new route may be saved for use on future trips as a default route between, at least, the vehicle's current location to the vehicle's destination or another location in the vicinity of the vehicle's destination. When the new route is set as the default route, that route may be chosen by the vehicle control unit 320, over other possible routes, when the vehicle is requested in the future to travel to its destination (or another location in the destination's vicinity). Doing so may enable the vehicle 101 to avoid construction zones or other instances that are likely to persist.

As discussed further below, the presence of a certain type of special-purpose vehicle may signal the existence of a corresponding road condition. For example, the presence of a construction vehicle on the road may indicate that the section of road where the vehicle 101 is currently driving (or leads to) is a construction zone. As another example, the presence of an ambulance may signal that the vehicle 101 is located near the scene of an accident. In that regard, saving the new route as default may allow the vehicle to avoid sections of road that are likely to continue experiencing delays in the future. In some aspects, setting the new route as default may include changing a cost value in the associated with a particular section of road in the map data structure 434.

FIG. 10 depicts a flowchart of an example process 1000 associated with determining the first travel route for the vehicle 101. The first travel route connects the current location of the vehicle 101 to the destination specified at task 910. The first travel route is determined using the costs for different road sections that are specified in the map data structure 434. In this example, the costs depicted in FIG. 6 are used.

At task 1010, a first cost that is associated with a first road section is obtained. In this example, the cost associated with the road section C-F (i.e., the collection of road sections from Intersection C to Intersection F) is obtained. At task 1020, a first route for the vehicle 101 to follow is determined. As discussed above, the first route may be determined by executing a path search algorithm, such as Djikistra's, that uses the costs associated with various road sections in the surroundings of the vehicle 101 to determine a path between the vehicle's 101 current location and the travel destination specified at task 910. In this example, the first route is the route 510, depicted in FIG. 5. Because the road section C-F has a comparatively high cost relative to other road sections in the graph 434, as illustrated in FIG. 6, that road section is not included in the route 510.

FIG. 11 depicts a flowchart of an example process 1100 associated with changing the travel route that is being followed by the vehicle 101 in response to detecting the special-purpose vehicle. In this example, the vehicle 101 is switched from following the first route (e.g., route 510) to following a second route. Furthermore, in this example, the second route is the route 520, depicted in FIG. 5. Switching to the route 520 may help the vehicle 101 to bypass any congestion, due to an accident or road construction, that occurs in road sections C-D and D-F.

At task 1110, the vehicle control unit 320 determines a second cost for road section C-F. In one aspect, the second cost may be determined by the vehicle control unit 320 based on the state of the vehicle 210. For example, if the special-purpose vehicle 210 is stopped and assisting someone, the second cost may be set to equal the first cost. In such circumstances, the vehicle 101 is already present at the scene of an accident and further delays down route 510 are unlikely. In contrast, if the vehicle 210 is sounding its sirens and speeding forward, this may indicate that a serious accident has occurred further down road 500 or route 510 and thus the second cost may be set to a value smaller than the first cost.

The second cost may be calculated by either increasing the first cost for the road section C-F (e.g. the cost identified in FIG. 6) or by using a predetermined formula that does not take into consideration the value of the first cost. In this example, the cost for the stretch of C-F may be changed from "25" to "1." Lowering the cost in this manner may induce the vehicle control unit 320 to include the road section C-F in the new travel route, thereby causing the vehicle 101 to bypass a potential congestion in the road sections C-D and D-F. Decreasing the cost associated with the road section C-F may increase the chances of the road section C-F being included in the second route. Including the road section C-F in the second route may cause the vehicle 101 to be diverted from the direction in which the special-purpose vehicle 210 is going (e.g., the direction of road section C-D and E-F and a possible accident).

In another aspect, the second cost may be determined by the vehicle control unit 320 based on the type of the vehicle 210. For example, if the special-purpose vehicle 210 is a backhoe, this might be considered a strong indication that the vehicle 101 is entering a construction zone. In such circumstances, the second cost may be set to a value $C_1$. By contrast, if the special-purpose vehicle 210 is a large truck, this might be considered a weak indication that the vehicle 101 is entering a construction zone, and thus the second cost may be set to value $C_2$, wherein $C_2 > C_1$. As noted above, in this example, the cost associated with a given road section is inversely proportional to the likelihood of that section being included in the second route. In that regard, setting the cost to a lower value when the special-purpose vehicle 210 is a backhoe increases the likelihood that the vehicle 101 would be diverted from the construction zone that it might be entering.

In yet another aspect, the second cost may be determined by the vehicle control unit 320 based on the number of special purpose vehicles detected by the vehicle control unit 320. For example, the fewer the special-purpose vehicles, the lesser the amount by which the cost is decreased.

Furthermore, the disclosure is not limited to calculating a second cost for any particular road section. Although in the above example the second cost belongs to the section C-F, in other examples the second cost may belong to a road section that is located anywhere in the map. As discussed above, the cost for a given section may be changed in order to shift the balance between the costs for various road sections in the map data 434 and influence the selection of one route over another. In the above examples, the cost of the section C-F is lowered and as a result the same section is included into the second route 520, thereby causing the vehicle 101 to be diverted away from section C-D. The same effect however may be also achieved by increasing the value of a competing road section, such as C-D beyond the original cost of the road section C-F (i.e., 25). For this reason, the disclosure is not limited to calculating a second cost for any particular road section.

At task 1120, the second cost is used (instead of the first cost) by the vehicle control unit 320 in calculating a second travel route to the destination entered at task 910. The second travel route may be determined using the same method as discussed with respect to the first route. As noted above, in this example, the second travel route is the route 520. At task 1130, the vehicle 101 begins following the second route. In some instances, the vehicle control unit 320 may present on a user interface (e.g., display screen or speaker) a menu prompting a user to approve of the vehicle 101 switching to following the second route 520. In such instances, the vehicle 101 may begin following the first route only when user approval is received. If the user declines, the vehicle 101 may continue to follow the route 510.

Figures 12, 13:
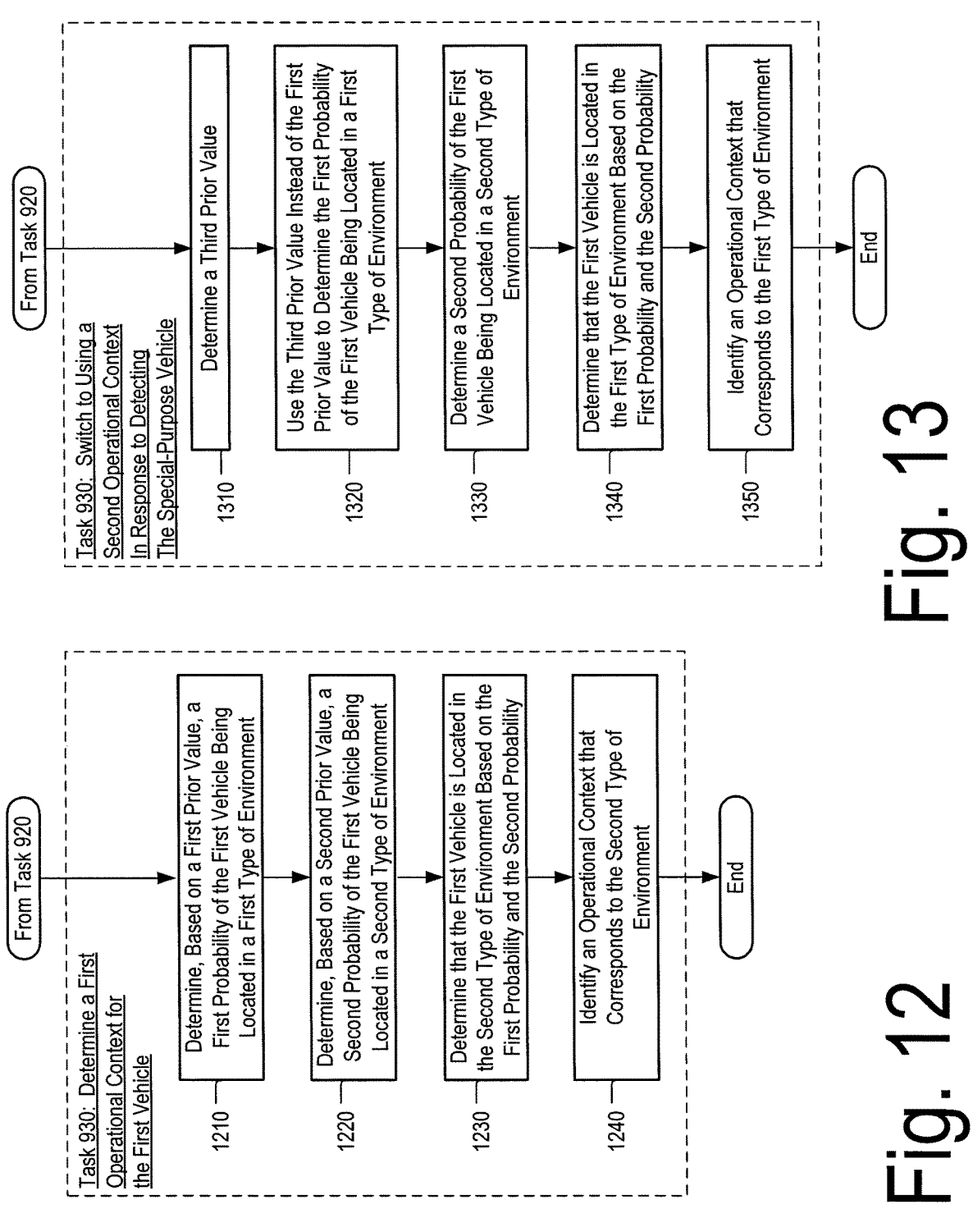
FIG. 12 depicts a flowchart of a process associated with FIG. 9.
FIG. 13 depicts a flowchart of a process associated with FIG. 9.

FIG. 12 depicts a flowchart of an example process 1200 associated with the selection of an operational context for the vehicle 101. At task 1210, the vehicle control unit 320 determines the probability $P_1$ of the vehicle 101 being located in a first type of environment based on input from the vehicle's sensors. The first type of environment may be one of a construction zone, a scene of an accident, an urban zone, or a highway. The probability $P_1$ for the first type of environment may be determined using a function $F_1(S_1, r_1)$, where $F_1$ is the probability, S is input from the sensors 330 and $r_1$ is a predetermined prior value. The prior value $r_1$ may be a weight or another type of value for the input from the sensors that is used in the calculation of the probability $P_1$.

At task 1220, the vehicle control unit 320 determines the probability $P_2$ of the vehicle 101 being located in a second type of environment. The second type of environment may be another one of a construction zone, a scene of an accident, an urban zone, or a highway. The probability $P_2$ for a given type of environment may be determined using a function $F_2(S_2, r_2)$, where $F_2$ is the probability, S is input from the sensors 330 and $r_2$ is a prior value. As with prior value $r_1$, the prior value $r_2$ may be a predetermined weight or another type of value that is used in calculating the probability $P_2$. The function $F_1$ may be the same or different than $F_2$. Similarly, the prior value $r_1$ may be the same or different than $r_2$.

At task 1230, the vehicle control unit 320 determines the type of the environment where the vehicle 101 is located based on the probabilities calculated at tasks 1210-1220. By way of example, if the probability $P_1$ is greater than the probability $P_2$, then the vehicle control unit 320 may determine that the vehicle 101 is located in the first type of environment. If the probability is $P_2$ greater than the probability $P_1$, then the vehicle control unit 320 may determine that the vehicle 101 is located in the second type of environment. In this example, the vehicle control unit 320 determines that the vehicle 101 is currently located in the first type of environment. Although this example uses only two probabilities for two types of environments, similar determinations may be made for many more probabilities for environment types.

At task 1240, the vehicle control unit 320 identifies an operational context of behavioral executive 730 that is associated with the type of environment in which the vehicle 101 is currently located. The identified operational context, as noted with respect to task 940, may be used to operate the vehicle. For example, if the vehicle 101 is located in an urban environment, then the urban operational context 830 may be selected and the vehicle 101 may be operated in accordance with control rules that are part of that context. The context selection may be performed by using a table, or another similar data structure, that relates types of environments to their corresponding operational context. The table may be stored in the memory 430 of the vehicle control unit 320.

FIG. 13 depicts a flowchart of an example process 1300 associated with changing the operational context of the vehicle 101 in response to detecting a special-purpose vehicle on the road. At task 1310, the vehicle control unit 320 determines a prior value $r_3$. The prior value $r_3$ may be a weight or another constant for the input from the sensors that is used in re-calculating the probability $P_3$. In one example, the prior value $r_3$ may be determined based on the prior value $r_1$. In other examples, however, the prior value $r_3$ may be determined according to a formula that is unrelated to the prior value $r_2$.

In one aspect, the prior value $r_3$ may be determined based on the type of the special-purpose vehicle 210. For example, the prior value $r_3$ may be set to have one magnitude if the special-purpose vehicle that is identified at task 960 is a backhoe and a different magnitude if the special-purpose vehicle is a truck. The prior value $r_3$ may be set this way because the presence of a backhoe might be considered to signal more strongly that the vehicle 101 is located in a construction zone than the presence of a truck. In that regard, by setting the prior value $r_3$ in this way, it may become more likely (or less likely) for the vehicle control unit 320 to determine that the vehicle 101 is located in the second type of environment (e.g., construction zone) and not the first type of environment (e.g., an urban zone) when the determination of operational context made at task 930 is reconsidered.

In another aspect, the prior value $r_3$ may depend on a number of special-purpose vehicles that are sharing the road with the vehicle 101. For example, the prior value $r_3$ may be proportional or inversely proportional to the number of special-purpose vehicles. In yet another aspect, the prior value $r_3$ may depend on the state of the special-purpose vehicles that are sharing the road with the vehicle 101. For example, the prior value $r_3$ may be given a greater value when the sirens of the special-purpose vehicle 230 are on than otherwise. This, in turn, may make it more likely for the vehicle control unit 320 to find that it is located at the scene of an accident when the determination of operational context made at task 930 is reconsidered.

At task 1320, the vehicle control unit 320 determines the probability $P_1$ of the vehicle 101 being located in a first type of environment. The probability $P_1$ for the first type of environment may be determined using a function $F_1 (S_1, p_3)$, where S is input from the sensors 330 and $r_3$ is the prior value determined at task 1230.

At task 1330, the vehicle control unit 320 determines the probability $P_2$ of the vehicle 101 being located in a second type of environment. Task 1330 is identical to task 1320. At task 1230, the vehicle control unit 320 determines the type of the environment where the vehicle 101 is located based on the probabilities calculated at tasks 1320-1330. Task 1340 is identical to task 1330. At task 1350, the vehicle control unit 320 identifies an operational context that is associated with the type of environment the vehicle 101 is currently located in. As noted above, the type of environment, in one example, may be a construction zone, urban zone, highway zone, or a scene of an accident. Task 1350 is identical to task 1240.

At task 1360, the vehicle control unit 320 begins operating the vehicle 101 in accordance with the identified operational context. The odds of selecting a given type of environment as the current environment of the vehicle 101 may be skewed by modifying the prior value associated with any possible type of environment and not simply a first type of environment or a second type of environment.

FIGS. 1-13 are provided as examples only. Specifically, the route of the vehicle 101 may be changed based on detecting a special-purpose vehicle in the vicinity of the vehicle 101 in accordance with any process, and not just the one described with respect to FIG. 11. Similarly, the operational context of the vehicle 101 may be changed based on detecting a special-purpose vehicle in the vicinity of the vehicle 101 in accordance with any process, and not just the one described with respect to FIG. 13.

At least some of the tasks may be performed in a different order than represented, performed concurrently, or altogether omitted. As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method, comprising:
   determining, by one or more processors based on sensor data, a presence of a special-purpose vehicle in an environment of a vehicle operating in an autonomous driving mode;
   determining, by the one or more processors based on the presence of the special-purpose vehicle, an operational state of the special-purpose vehicle by at least determining whether the special-purpose vehicle is making a noise associated with operation of the special-purpose vehicle;
   determining, by the one or more processors based on the operational state of the special-purpose vehicle, at least one of an instantaneous operation for the vehicle operating in the autonomous driving mode or a continued operation for the vehicle operating in the autonomous driving mode; and
   causing a system of the vehicle operating in the autonomous driving mode to perform a selected action according to the at least one of the instantaneous operation or the continued operation.

2. The method of claim 1, wherein the operational state indicates whether the special-purpose vehicle is operating along a roadway in the environment or is pulled over on a side of the roadway.

3. The method of claim 1, wherein determining the operational state of the special-purpose vehicle includes determining at least one of a relative direction or a distance between the special-purpose vehicle and the vehicle operating in the autonomous driving mode.

4. The method of claim 1, wherein determining the operational state of the special-purpose vehicle includes determining whether one or more lights of the special-purpose vehicle are flashing.

5. The method of claim 1, wherein determining the operational state of the special-purpose vehicle includes determining whether an audible alarm is being emitted by the special-purpose vehicle.

6. The method of claim 1, wherein the selected action includes communicating information to a rider of the vehicle operating in the autonomous driving mode.

7. The method of claim 6, wherein communicating the information includes presenting, via a user interface, a user option to approve changing a route of the vehicle operating in the autonomous driving mode.

8. The method of claim 6, wherein communicating the information includes changing a state of one or more systems of the vehicle operating in the autonomous driving mode.

9. The method of claim 8, wherein changing the state of the one or more systems includes making a visual or audible adjustment to the one or more systems.

10. The method of claim 8, wherein changing the state of the one or more systems includes causing a driving system of the vehicle to change a driving lane, slow the vehicle down, or pull the vehicle over.

11. The method of claim 1, wherein determining the presence of the special-purpose vehicle includes comparing one or more characteristics associated with the sensor data to a stored template or model.

12. The method of claim 11, wherein the stored template or model is used to indicate a color trait or intensity of light to be produced by the special-purpose vehicle.

13. The method of claim 11, wherein the stored template or model corresponds to a special-purpose vehicle image, a histogram of the special-purpose vehicle image, a set of values that describe a given property of the special-purpose vehicle image, or a set of vertices that describe at least a part of a shape of the special-purpose vehicle.

14. The method of claim 11, wherein the stored template or model corresponds to a sound of a vehicle component associated with to the special-purpose vehicle.

15. The method of claim 11, wherein the comparing includes determining whether the one or more characteristics associated with the sensor data correspond to the stored template or model by at least a threshold amount.

16. The method of claim 1, wherein the instantaneous operation includes one of speeding up, slowing down, pulling over, or changing lanes.

17. The method of claim 1, wherein the continued operation comprises switching from driving along a current driving route to following an alternative driving route.

18. A vehicle, comprising:

one or more sensors configured to obtain sensor data for objects in an environment of the vehicle; and one or more processors operatively coupled to the one or more sensors, the one or more processors configured to:

determine, based on the sensor data obtained by the one or more sensors, a presence of a special-purpose vehicle in an environment of the vehicle during operation in an autonomous driving mode;

determine, based on the presence of the special-purpose vehicle, an operational state of the special-purpose vehicle, including determination of whether the special-purpose vehicle is making a noise associated with operation of the special-purpose vehicle;

determine, based on the operational state of the special-purpose vehicle, at least one of an instantaneous operation for the vehicle operating in the autonomous driving mode or a continued operation for the vehicle operating in the autonomous driving mode; and cause a system of the vehicle during operation in the autonomous driving mode to perform a selected action according to the at least one of the instantaneous operation or the continued operation.

19. The vehicle of claim 18, wherein the one or more processors are configured to determine the operational state of the special-purpose vehicle by being further configured to:

determine of at least one of a relative direction or a distance between the special-purpose vehicle and the vehicle operating in the autonomous driving mode;

determine of whether one or more lights of the special-purpose vehicle are flashing; or determine of whether an audible alarm is being emitted by the special-purpose vehicle.

\* \* \* \* \*